UNITED STATES PATENT OFFICE.

LEVI T. CHEEVER, OF EAST GREENWICH, RHODE ISLAND.

IMPROVEMENT IN FIRE-KINDLING MATERIALS.

Specification forming part of Letters Patent No. 6,125, dated February 20, 1849.

*To all whom it may concern:*

Be it known that I, LEVI T. CHEEVER, of East Greenwich, in the county of Kent and State of Rhode Island, have invented a new and useful or Improved Fire-Kindling Composition; and I do hereby declare that the ingredients thereof and manner of compounding the same are hereinafter fully set forth and described.

The particular object of my invention is to kindle fires; and in making it I have tried to combine mineral combustible materials not easily ignitible with vegetable combustible materials, cheap, easily procurable, and of easy ignition in comparison with the mineral matters, and to do so by one or more vehicles or resinous matters and essential oils, which when combined together will not only possess the properties of quick ignition and mechanically connecting the aforesaid matters, but of doing so without rendering such matters liable to crumble or fall apart during transportation.

The ingredients of my improved composition are mineral coal, (bituminous or anthracite, or both combined,) sawdust, or comminuted uncharred vegetable material, charcoal, or charred vegetable material, and resin and essential oil of turpentine, (spirits of turpentine.)

In preparing the composition, I take equal quantities of pulverized charcoal or bituminous coal, or bituminous coal and anthracite coal, and mix with the same four times its measure of wood sawdust. I next heat ten pounds of resin very hot and mix with it about two gills of spirits of turpentine, and I add such quantities of resin and turpentine to every eight quarts of the afore-described mixtures of mineral coal and vegetable matters or charcoal and sawdust. The whole is next to be suitably and thoroughly incorporated together and pressed into molds in such shape or shapes as may be most convenient for use and transportation. Without the essential oil or spirits of turpentine the resin would not possess sufficient tenacity, it being so brittle that I have found that materials when held in mechanical combination with it are very liable in transportation to crumble apart. In destroying or overcoming the brittleness of the resin it becomes necessary to make use of some substance which not only possesses a property of so doing, but which at the same time possesses another— viz., that of ready or rapid ignition or very quick inflammable properties, all this being found in the essential oil of turpentine.

The crude turpentine, or turpentine in its natural state, contains too much essential oil to enable it to be used to good advantage—that is to say, the resinous matter required for any given quantity of other material would be found mixed with too much essential oil and would be too soft, and consequently would make the compound of which it was the adhesive vehicle too soft. Now, if the native turpentine be boiled down, so as to discharge the surplus essential oil, it will be evident that we suffer not only the loss of time and expense of so doing, but the loss of so much essential oil. I therefore, for the sake of economy and in order to produce a compound containing the necessary degree of tenacity and ability to remain hard under all ordinary changes of atmospheric temperature, prefer to make use of the manufactured resin and to soften the same by spirits of turpentine, in manner and to the extent required.

I employ the charcoal for the special purpose of facilitating combustion or readily leading the flame from the turpentine and resin into the mineral coal and uncharred vegetable materials. The addition of the carbon or charcoal facilitates combustion as it does when used to kindle common anthracite or bituminous coal or a wood fire, and for this reason it improves the composition and renders it better than if made with bitumen or bituminous matters in connection with the others. The charcoal or charred vegetable matter interposed between the sawdust and coal becomes first attacked by the flame of the resin when in combustion and serves to readily communicate the flame to the sawdust and coal, which by their slow combustible properties prolong the flame or serve to keep it up for a considerable time. A very small piece—a cubic inch, for instance—of my said composition, when brought in contact with a lighted match, instantly and readily takes fire, and will produce so much flame and is so long a time in process of being destroyed by such flame that said small quantity or cubic inch or less will generally be found quite sufficient, if not more than sufficient, to kindle an ordinary coal fire.

I make no claim to the use of turpentine in its crude or native state, as the great quantity of essential oil in proportion to the resin therein prevents me from making a composition possessing the desirable qualities, as above enumerated; but What I do claim is—

The combination and use of the spirits of turpentine with the charcoal and other materials herein named for the purpose of so softening the resinous materials of the composition as to enable them to adhere with tenacity after compression, and thereby to sustain the shocks incident to transportation without fracture.

In testimony whereof I have hereto set my signature this 16th day of January, A. D. 1849.

LEVI T. CHEEVER.

Witnesses:
 OLIVER W. POLLARD,
 EZRA POLLARD.